(12) United States Patent
Terkes et al.

(10) Patent No.: US 9,272,733 B2
(45) Date of Patent: Mar. 1, 2016

(54) METHOD FOR PARKING A VEHICLE AND CORRESPONDING PARKING ASSISTANCE SYSTEM AND VEHICLE

(75) Inventors: Mehmet Terkes, Braunschweig (DE); Ulrich Wuttke, Braunschweig (DE); Philipp Hüger, Rühen (DE); Torsten Wendler, Braunschweig (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 13/697,347

(22) PCT Filed: May 9, 2011

(86) PCT No.: PCT/EP2011/002296
§ 371 (c)(1),
(2), (4) Date: Jan. 11, 2013

(87) PCT Pub. No.: WO2011/141149
PCT Pub. Date: Nov. 17, 2011

(65) Prior Publication Data
US 2013/0116878 A1    May 9, 2013

(30) Foreign Application Priority Data
May 12, 2010    (DE) .......................... 10 2010 020 205

(51) Int. Cl.
*B62D 15/02*    (2006.01)
*B60W 30/06*    (2006.01)

(52) U.S. Cl.
CPC ........... *B62D 15/0285* (2013.01); *B60W 30/06* (2013.01); *B62D 15/028* (2013.01)

(58) Field of Classification Search
CPC .. B62D 15/028; B62D 15/0285; B60W 30/06
USPC .......................................................... 701/23
See application file for complete search history.

(56) References Cited

U.S. PATENT DOCUMENTS

| 7,865,283 B2* | 1/2011 | Ishihara et al. ................. 701/41 |
| 2003/0067780 A1* | 4/2003 | Fukawa ....................... 362/466 |
| 2005/0236201 A1* | 10/2005 | Spannheimer et al. ....... 180/204 |
| 2012/0136506 A1* | 5/2012 | Takeuchi et al. ................. 701/1 |

FOREIGN PATENT DOCUMENTS

| CN | 101198509 A | 6/2008 |
| DE | 10261176 A1 | 7/2004 |
| DE | 10337842 A1 | 1/2005 |
| DE | 102004055584 A1 | 7/2005 |

(Continued)

OTHER PUBLICATIONS

English translation of DE 102005027165 A1.*

(Continued)

*Primary Examiner* — Fadey Jabr
*Assistant Examiner* — Yazan A. Soofi
(74) *Attorney, Agent, or Firm* — Barnes & Thornburg LLP

(57) ABSTRACT

Automatic monitoring to determine whether, during a parking process of a parking assistance system of the vehicle, the vehicle is at an end of a current maneuver of the parking process. If the vehicle is at the end of the current maneuver of the parking process, a braking request of the driver of the vehicle to activate a brake of the vehicle is generated automatically.

18 Claims, 3 Drawing Sheets

(56) References Cited

FOREIGN PATENT DOCUMENTS

| | | | |
|---|---|---|---|
| DE | 102005017360 | A1 | 11/2005 |
| DE | 102004039179 | A1 | 2/2006 |
| DE | 102005027165 | A1 * | 12/2006 |
| DE | 102005061909 | A1 | 7/2007 |
| DE | 102006031961 | A1 | 10/2007 |
| DE | 102006027114 | A1 | 12/2007 |
| DE | 102006046055 | A1 | 4/2008 |
| DE | 102006056966 | A1 | 6/2008 |
| EP | 1626384 | A2 | 2/2006 |
| EP | 1642769 | A1 | 4/2006 |
| WO | 2006133996 | A1 | 12/2006 |

OTHER PUBLICATIONS

Search Report for German Patent Application No. 10 2010 020 205.3; Jul. 20, 2011.
Search Report for International Patent Application No. PCT/EP2011/002296; Sep. 22, 2011.
Office Action for Chinese Patent Application No. 201180033793.1.

* cited by examiner

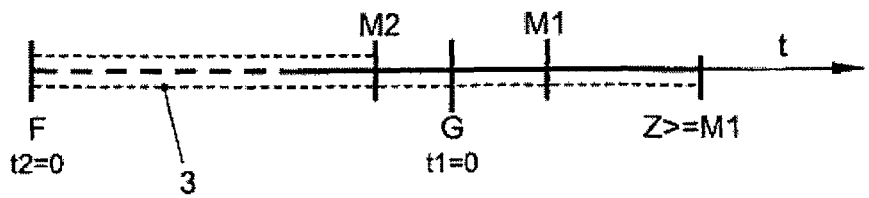
FIG. 2a
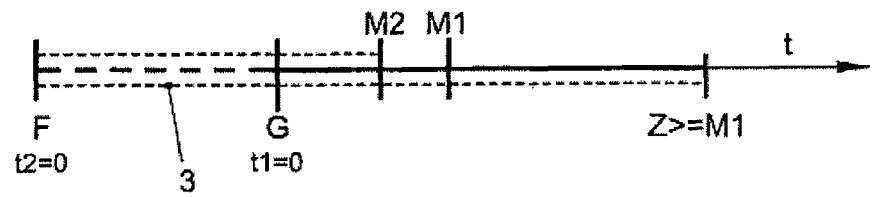
FIG. 2b
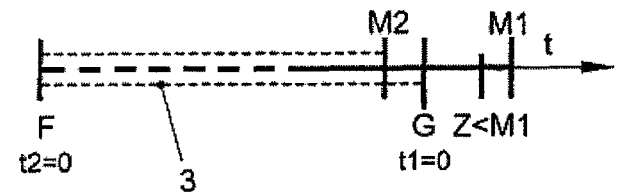
FIG. 2c
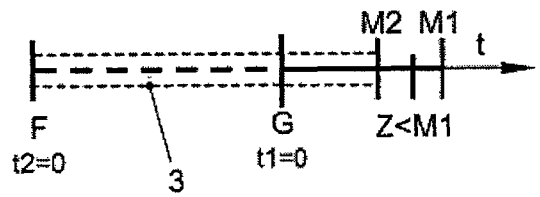
FIG. 2d
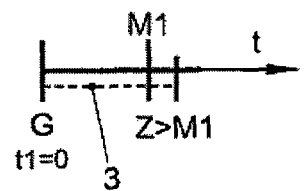
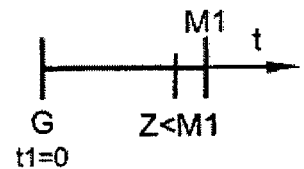
FIG. 3aFIG. 3b

METHOD FOR PARKING A VEHICLE AND CORRESPONDING PARKING ASSISTANCE SYSTEM AND VEHICLE

PRIORITY CLAIM

This patent application is a U.S. National Phase of International Patent Application No. PCT/EP2011/002296, filed 9 May 2011, which claims priority to German Patent Application No. 10 2010 020 205.3, filed 12 May 2010, the disclosures of which are incorporated herein by reference in their entirety.

FIELD

Disclosed embodiments relate to a method for parking a vehicle using a parking assistance system, and to a correspondingly configured parking assistance system and vehicle.

BACKGROUND

According to the prior art, numerous parking assistance systems are known, see, for example, DE 10 2006 056 966 A1, DE 10 2005 061 909 A1, DE 10 2005 017 360 A1, DE 10 2004 039 179 A1, DE 103 37 842 A1 and DE 10 2004 055 584 A1.

In particular, in the case of semi-automated parking assistance systems in which the parking assistance system performs the lateral guidance, in particular the steering, of the vehicle, but longitudinal guidance of the vehicle, i.e. in particular braking and acceleration of the vehicle, is carried out by the driver of the vehicle, from time to time the driver accelerates the vehicle at the wrong point in time and therefore the number of maneuvers required to park the vehicle is unnecessarily increased.

SUMMARY

Disclosed embodiments provide a method for automatically parking a vehicle by a parking assistance system and by a vehicle.

BRIEF DESCRIPTION OF FIGURES

In the text which follows, the present invention will be described in detail by means of disclosed embodiments with reference to the figures. In the drawings:

FIGS. 2a-2d are graphic illustrations of how long a braking request is displayed after a changeover of the direction indication;

FIGS. 3a and 3b illustrate graphically when and for how long a braking request is displayed after a non-requested gear speed change;

DETAILED DESCRIPTION OF DISCLOSED EMBODIMENTS

Figure 1:
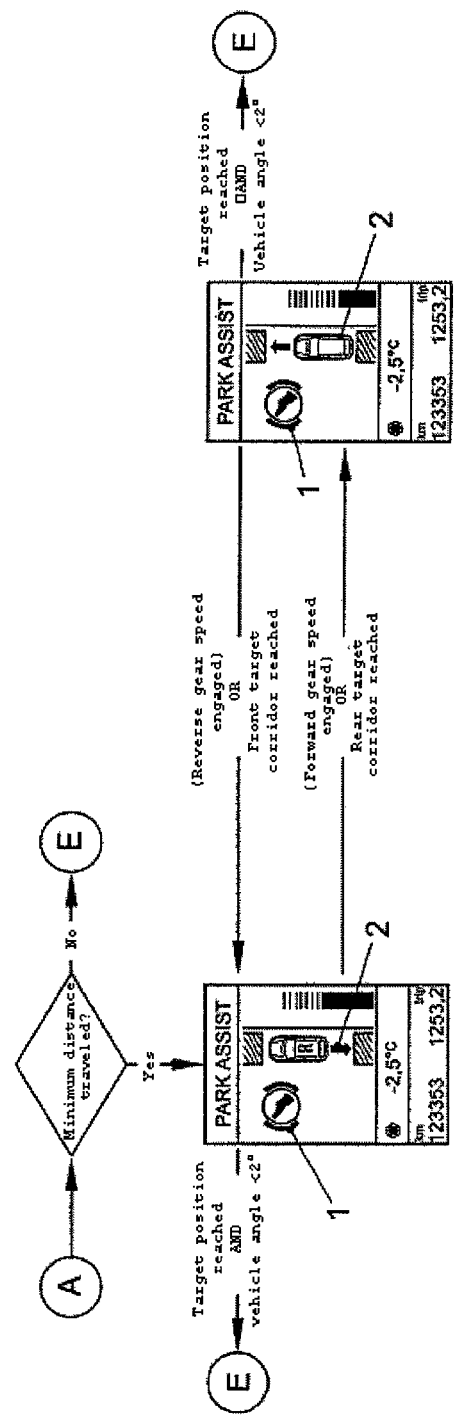
FIG. 1 is a flowchart illustrating when which direction indication is given.

Disclosed embodiments provide a method for parking a vehicle using a parking assistance system is made available. In this context it is automatically monitored whether, during a parking space entering process of the parking assistance system, the vehicle is located at an end of a current maneuver of the parking space entering process. If it is detected that the vehicle is located at the end of the current maneuver, a braking request for the driver of the vehicle is automatically generated so that the driver activates a brake of the vehicle. The braking request can either be of an optical nature (for example a display), of an acoustic nature (for example a sequence of tones) or of a haptic nature (for example a movement of the steering wheel).

As a result of the generation of the braking request, the parking assistance system is advantageously given sufficient time to set the steering angle in accordance with the next maneuver of the parking space entering process. As a result, the parking space entering process can be carried out as planned by the parking assistance system.

One end of the current maneuver occurs if the end, calculated in advance by the parking assistance system, of the current maneuver (a corresponding target position) has been reached or if the current maneuver is actively ended by the driver of the vehicle, for example by means of a gear speed change. In this context, the end of a maneuver which is actively brought about by the driver generally does not correspond to the end of the maneuver which is calculated by the parking assistance system.

A time period over which the braking request is generated can depend here, on the one hand, on a point in time at which a gear speed change of the vehicle takes place and, on the other hand, on a target steering angle which corresponds to a maneuver which directly follows the current maneuver.

The target steering angle corresponds here to the steering angle of the vehicle which, according to the parking assistance system, is to be set for the next maneuver, i.e. that maneuver which follows the current maneuver.

At the end of a maneuver which is calculated by the parking assistance system, a direction indication of the parking assistance system changes, the direction indication indicating whether the vehicle is to move forward or backward during the parking space entering process. After this changeover of the direction indication, the braking request is generated at least until the gear speed change has taken place.

In at least one disclosed embodiment, a steering duration Z is calculated as a function of the target steering angle TSA, the actual steering angle ASA and a speed of change of the steering angle SCSA, by means of the following equation (1):

$$Z = \frac{TSA - ASA}{SCSA} \quad (1)$$

After the gear speed change has taken place, the braking request is generated until the actual steering angle corresponds to the target steering angle, provided that the steering duration is longer than a first time period. If the steering duration is shorter than the first time period, no braking request is generated.

In at least one disclosed embodiment, after a changeover of the direction indication, the braking request is generated at least until a second time period has passed.

In other words, according to this disclosed embodiment the braking request is generated at least for the duration of the second time period (from the point in time at which the vehicle reaches the end of the current maneuver), even if the gear speed change has already taken place before the expiry of this second time period.

The direction indication, which indicates a setpoint forward movement or a setpoint reverse movement of the vehicle, changes, in particular, from indicating a setpoint forward movement to indicating a setpoint reverse movement if either the driver engages a reverse gear speed of the vehicle or if the vehicle is located at the end of the current calculated maneuver, which has been carried out as forward movement. In a similar way, the direction indication changes from indicating a setpoint reverse movement to indicating of a setpoint forward movement if the driver engages a forward gear speed of the vehicle or if the vehicle is located at the end of the current calculated maneuver which was carried out as a reverse movement.

Disclosed embodiments provide a parking assistance system for a vehicle is also made available. In this context, the parking assistance system comprises a device with which a braking request can be generated, a controller and at least one sensor. The parking assistance system is configured in such a way that the parking assistance system generates the braking request with the aid of the device during a parking space entering process of the parking assistance system if the parking assistance system senses, with the aid of the at least one sensor, that the vehicle is located at an end of a current maneuver of the parking space entering process.

Disclosed embodiments provide a vehicle which comprises a parking assistance system.

Disclosed embodiments are suitable, in particular, for vehicles which are configured with a semi-automatic parking assistance system, wherein the transverse steering is carried out by the parking assistance system, and the longitudinal steering is carried out by the driver of the vehicle.

Disclosed embodiments are also suitable, in particular, for vehicles which are configured with an automatic parking assistance system, wherein the transverse steering is carried out by the parking assistance system, and the longitudinal steering is carried out by the parking assistance system of the vehicle. Acoustic information can advantageously be additionally generated in the form of a tone, a sequence of tones or a voice output.

Of course, the present invention is not restricted to this disclosed field but can also be used in ships or aircraft.

A parking space entering process starts with a reverse movement of the vehicle, which is illustrated in FIG. 1 by the reference symbol A. As soon as the vehicle has driven a minimum distance, the direction indication 2 with setpoint reverse movement is indicated on an on-board computer of the vehicle. If the target position of the vehicle is reached during this reverse movement and the vehicle angle, i.e. the angle between the longitudinal axis of the vehicle and the longitudinal axis of the parking space, is smaller than 2°, the parking space entering process is concluded, which is illustrated with the reference symbol E.

When the vehicle reaches its target corridor at the rear, i.e. the vehicle is located at the end of the current maneuver or when the driver engages a forward gear speed, the direction indication 2 with a setpoint forward movement is displayed on the on-board computer. In this case, generally the braking foot 1 or the braking request also appears, as is explained in detail in FIGS. 2 and 3. If the target position of the vehicle is reached during this forward movement and the vehicle angle is smaller than 2°, the parking space entering process is concluded, which is illustrated with the reference symbol E.

When the vehicle reaches its target corridor at the front, i.e. the vehicle is located at the end of the current maneuver or when the driver engages a reverse gear speed, the direction indication 2 with a setpoint reverse movement is displayed on the on-board computer, and the vehicle or the parking assistance system is again in the state already described above. In this case, the braking foot 1 generally also appears, as is explained in more detail in the text which follows.

FIG. 2 illustrates over what time period 3 the braking foot is displayed in specific situations after a changeover of the direction indication 2. In this context, the reference symbol F indicates the point in time at which the direction indication 2 changes its setpoint movement direction (i.e. from reverse movement to forward movement or from forward movement to reverse movement). Reference symbol G indicates the point in time at which the gear speed change has taken place.

In FIG. 2a, the gear speed change G occurs after the expiry of the time period M2, and the steering period Z for the setting of the target angle of the next maneuver is longer than the time period M1, with the result that the braking foot 1 is displayed for the duration of the steering period Z beyond the point in time G.

In FIG. 2b, the gear speed change G takes place before the expiry of the time period M2 and the steering period Z is in turn longer than the time period M1. The braking foot 1 is therefore still displayed for the duration of the steering period Z after the point in time G.

In FIG. 2c, the gear speed change G takes place after the expiry of the time period M2, but the steering period Z is shorter than the time period M1, with the result that the braking foot 1 is displayed only up to the point in time G.

In FIG. 2d, the gear speed change G takes place before the expiry of the time period M2, and the steering period Z is shorter than the time period M1. The braking foot 1 is therefore displayed from the point in time F over the time period M2.

FIG. 3 deals with the case in which the driver changes the gear speed without being requested to by a changeover of the direction indication or direction instruction 2.

In FIG. 3a, the steering period Z is longer than the time period M1, with the result that the braking foot 1 is displayed from the point in time of the gear speed change G over the steering period Z.

In contrast, in FIG. 3b the steering period Z is shorter than the time period M1, with the result that the braking foot 1 is not displayed.

Figure 4:
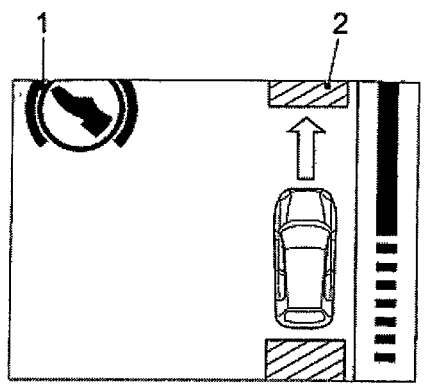
FIG. 4 illustrates a specific form of a braking request indication and the direction indication in an enlarged form.

In FIG. 4, the braking request or the braking foot 1 and the direction indication 2 are displayed in an enlarged form.

Figure 5:
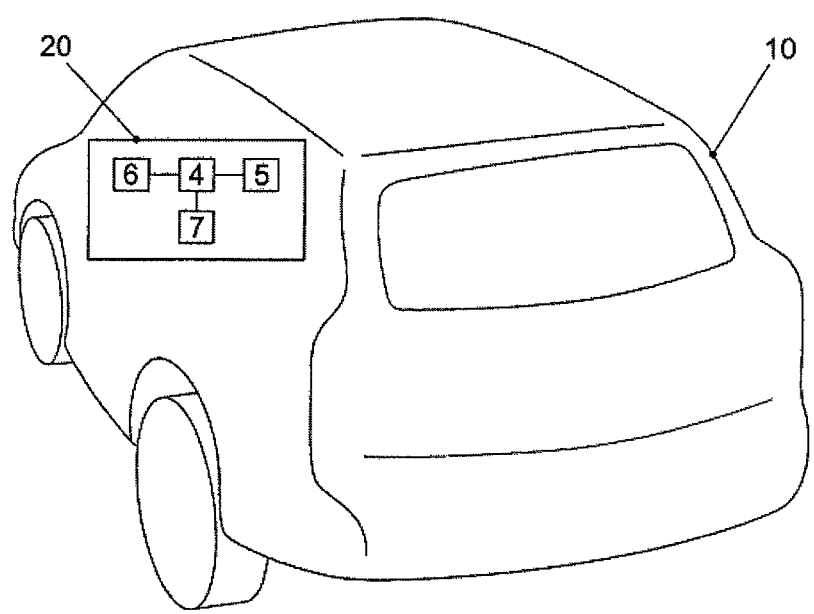
FIG. 5 is a schematic view of a vehicle with a parking assistance system.

FIG. 5 illustrates schematically a vehicle 10 which comprises a parking assistance system 20. The parking assistance system 20 itself comprises in turn a controller 4, a position sensor 5, a gear speed change sensor 6 and an on-board computer 7. The parking assistance system 20 senses the position of the vehicle 10 by means of the position sensor 5 and can therefore derive whether the vehicle 10 is located at the end of a maneuver. In contrast, the parking assistance system senses, with the gear speed change sensor 6, a change from a reverse gear speed into a forward gear speed or a change from a reverse gear speed into a forward gear speed of the vehicle.

The invention claimed is:

1. A method for parking a vehicle using a parking assistance system, comprising:
monitoring, via a parking assistance system during a parking space entering process, whether the vehicle is located at an end of a current maneuver of the parking space entering process; and
generating, via the parking assistance system during the parking space entering process, a braking request for the driver of the vehicle to activate a brake of the vehicle if the monitoring detects that the vehicle is located at the end of the current maneuver of the parking space entering process, wherein the braking request is generated for a time period which is dependent on
(i) a point in time at which a gear speed change of the vehicle takes place during the parking space entering process, and
(ii) a ratio of (a) a difference between a target steering angle and an actual steering angle, and (b) a speed of change of the steering angle during the parking space entering process.

2. The method of claim 1, wherein the target steering angle corresponds to a maneuver which directly follows the current maneuver.

3. The method of claim 2, wherein a steering duration Z is determined as follows:

$$Z = \frac{TSA - ASA}{SCSA}$$

wherein TSA is the target steering angle, ASA is the actual steering angle and SCSA is the speed of change of the steering angle, and
wherein the braking request is indicated until the actual steering angle corresponds to the target steering angle if the steering duration (Z) is longer than a minimum braking request-generating period.

4. The method of claim 2, wherein, after a changeover of a direction indication of the parking assistance system, the braking request is generated at least until the gear speed change has taken place or until a minimum request period has passed.

5. The method of claim 4, wherein the direction indication indicates a setpoint forward movement or a setpoint reverse movement of the vehicle, and wherein the direction indication changes from indicating the setpoint forward movement to indicating the setpoint reverse movement if a reverse gear speed of the vehicle is engaged or if the vehicle is located at the end of the current maneuver, and the direction indication changes from indicating the setpoint reverse movement to indicating the setpoint forward movement if a forward gear speed of the vehicle is engaged or if the vehicle is located at the end of the current maneuver.

6. A parking assistance system for a vehicle comprising:
a device that generates a braking request;
a controller; and
at least one sensor, wherein the device generates the braking request during a parking space entering process of the parking assistance system if the at least one sensor senses that the vehicle is located at an end of a current maneuver of the parking space entering process, wherein the braking request is generated for a time period which is dependent on
(i) a point in time at which a gear speed change of the vehicle takes place during the parking space entering process, and
(ii) a ratio of (a) a difference between a target steering angle and an actual steering angle, and (b) a speed of change of the steering angle during the parking space entering process.

7. The parking assistance system of claim 6, wherein the parking assistance system is configured to:
monitor, during a parking space entering process of the parking assistance system, whether the vehicle is located at an end of a current maneuver of the parking space entering process; and
generate a braking request for the driver of the vehicle to activate a brake of the vehicle if the monitoring detects that the vehicle is located at the end of the current maneuver of the parking space entering process.

8. A vehicle having a parking assistance system that comprises a vehicle parking assistance system comprising:
a device that generates a braking request;
a controller; and
at least one sensor, wherein the device generates the braking request during a parking space entering process of the parking assistance system if the at least one sensor senses that the vehicle is located at an end of a current maneuver of the parking space entering process, wherein the braking request is generated for a time period which is dependent on
(i) a point in time at which a gear speed change of the vehicle takes place during the parking space entering process, and
(ii) a ratio of (a) a difference between a target steering angle and an actual steering angle, and (b) a speed of change of the steering angle during the parking space entering process.

9. The method of claim 3, wherein, after a changeover of a direction indication of the parking assistance system, the braking request is generated at least until the gear speed change has taken place or until a minimum request period has passed.

10. The method of claim 9, wherein the direction indication indicates a setpoint forward movement or a setpoint reverse movement of the vehicle, and wherein the direction indication changes from indicating the setpoint forward movement to indicating the setpoint reverse movement if a reverse gear speed of the vehicle is engaged or if the vehicle is located at the end of the current maneuver, and the direction indication changes from indicating the setpoint reverse movement to indicating the setpoint forward movement if a forward gear speed of the vehicle is engaged or if the vehicle is located at the end of the current maneuver.

11. The vehicle of claim 8, wherein the target steering angle corresponds to a maneuver which directly follows the current maneuver.

12. The vehicle of claim 11, wherein a steering duration Z is determined as follows:

$$Z = \frac{TSA - ASA}{SCSA}$$

wherein TSA is the target steering angle, ASA is the actual steering angle and SCSA is the speed of change of the steering angle, and
wherein the braking request is indicated until the actual steering angle corresponds to the target steering angle if the steering duration (Z) is longer than a minimum braking request-generating period.

13. The vehicle of claim 11, wherein, after a changeover of the direction indication of the parking assistance system, the braking request is generated at least until the gear speed change has taken place or until a minimum request period has passed.

14. The vehicle of claim 13, wherein the direction indication indicates a setpoint forward movement or a setpoint reverse movement of the vehicle, and wherein the direction indication changes from indicating the setpoint forward movement to indicating the setpoint reverse movement if a reverse gear speed of the vehicle is engaged or if the vehicle is located at the end of the current maneuver, and the direction indication changes from indicating the setpoint reverse movement to indicating the setpoint forward movement if a forward gear speed of the vehicle is engaged or if the vehicle is located at the end of the current maneuver.

15. The parking assistance system of claim 7, wherein the target steering angle corresponds to a maneuver which directly follows the current maneuver.

16. The parking assistance system of claim 15, wherein a steering duration Z is determined as follows:

$$Z = \frac{TSA - ASA}{SCSA}$$

wherein TSA is the target steering angle, ASA is the actual steering angle and SCSA is the speed of change of the steering angle, and wherein the braking request is indicated until the actual steering angle corresponds to the target steering angle if the steering duration (Z) is longer than a minimum braking request-generating period.

17. The parking assistance system of claim 15, wherein, after a changeover of the direction indication of the parking assistance system, the braking request is generated at least until the gear speed change has taken place or until a minimum request period has passed.

18. The parking assistance system of claim 17, wherein the direction indication indicates a setpoint forward movement or a setpoint reverse movement of the vehicle, and wherein the direction indication changes from indicating the setpoint forward movement to indicating the setpoint reverse movement if a reverse gear speed of the vehicle is engaged or if the vehicle is located at the end of the current maneuver, and the direction indication changes from indicating the setpoint reverse movement to indicating the setpoint forward movement if a forward gear speed of the vehicle is engaged or if the vehicle is located at the end of the current maneuver.

* * * * *